United States Patent
Binjrajka et al.

(10) Patent No.: US 11,755,631 B2
(45) Date of Patent: Sep. 12, 2023

(54) WORKFLOW-BASED DYNAMIC DATA MODEL AND APPLICATION GENERATION

(71) Applicant: CEEBIT CORPORATION, McLean, VA (US)

(72) Inventors: Vikrant Binjrajka, McLean, VA (US); Alpa Kothari, Ashburn, VA (US); Ankit Singhal, Manassas, VA (US); Arindam Nath, Chinsurah (IN)

(73) Assignee: CEEBIT CORPORATION, McLean, VA (US)

( * ) Notice: Subject to any disclaimer, the term of this patent is extended or adjusted under 35 U.S.C. 154(b) by 164 days.

(21) Appl. No.: 16/898,158

(22) Filed: Jun. 10, 2020

(65) Prior Publication Data

US 2021/0326368 A1 Oct. 21, 2021

(30) Foreign Application Priority Data

Apr. 21, 2020 (IN) .............................. 202011017138

(51) Int. Cl.
*G06F 16/00* (2019.01)
*G06F 16/33* (2019.01)
*G06F 16/338* (2019.01)

(52) U.S. Cl.
CPC ........ *G06F 16/3332* (2019.01); *G06F 16/334* (2019.01); *G06F 16/338* (2019.01)

(58) Field of Classification Search
CPC .. G06F 16/3332; G06F 16/334; G06F 16/338; G06F 16/258; Y02P 90/30; G06Q 10/0633; G06Q 50/04
See application file for complete search history.

(56) References Cited

U.S. PATENT DOCUMENTS

| | | | | |
|---|---|---|---|---|
| 9,430,207 | B1 * | 8/2016 | Bandhole | H04W 4/50 |
| 2006/0236254 | A1 * | 10/2006 | Mateescu | G06F 8/75 |
| | | | | 715/762 |
| 2009/0222471 | A1 * | 9/2009 | Cacenco | G06F 8/20 |
| | | | | 707/999.102 |
| 2010/0274815 | A1 * | 10/2010 | Vanasco | G06F 16/9024 |
| | | | | 707/798 |
| 2012/0179986 | A1 * | 7/2012 | Zhang | G06F 9/453 |
| | | | | 715/762 |
| 2013/0055201 | A1 * | 2/2013 | No | G06F 8/30 |
| | | | | 717/113 |
| 2014/0368880 | A1 * | 12/2014 | Venugopal | G06F 3/1286 |
| | | | | 358/1.15 |
| 2017/0046135 | A1 * | 2/2017 | Hazarika | G06F 9/541 |
| 2020/0409934 | A1 * | 12/2020 | Bar Oz | H04L 67/40 |

FOREIGN PATENT DOCUMENTS

| | | | | | |
|---|---|---|---|---|---|
| CA | 2889387 A1 | * | 5/2013 | ......... | G06F 11/3664 |
| GB | 2590179 A | * | 6/2021 | ......... | G05B 19/042 |
| WO | WO-2017044290 A1 | * | 3/2017 | ......... | G06F 16/3341 |

* cited by examiner

*Primary Examiner* — Syed H Hasan
(74) *Attorney, Agent, or Firm* — Mannava & Kang, P.C.

(57) ABSTRACT

In some examples, workflow-based dynamic data model and application generation may include ascertaining, for an application that is to be generated, a plurality of fields that are declared. Based on the plurality of declared fields, a data model may be generated. The data model may include a plurality of application programming interface (API) keys associated with the plurality of declared fields. Based on the data model, a mapping file may be generated to map a plurality of APIs that are to be invoked relative to the API keys. Based on the data model and the mapping file, the application may be generated.

20 Claims, 12 Drawing Sheets

1100

ASCERTAIN, BY AT LEAST ONE HARDWARE PROCESSOR, FOR AN APPLICATION THAT IS TO BE GENERATED, A PLURALITY OF FIELDS THAT ARE DECLARED
1102

GENERATE, BY THE AT LEAST ONE HARDWARE PROCESSOR, BASED ON THE PLURALITY OF DECLARED FIELDS, A DATA MODEL
1104

GENERATE, BY THE AT LEAST ONE HARDWARE PROCESSOR, BASED ON THE DATA MODEL, A MAPPING FILE TO MAP A PLURALITY OF APIS THAT ARE TO BE INVOKED RELATIVE TO THE API KEYS
1106

GENERATE, BY THE AT LEAST ONE HARDWARE PROCESSOR, BASED ON THE DATA MODEL AND THE MAPPING FILE, THE APPLICATION
1108

*FIG. 11*

WORKFLOW-BASED DYNAMIC DATA MODEL AND APPLICATION GENERATION

PRIORITY

The present application claims priority under 35 U.S.C. 119(a)-(d) to Indian patent application number 202011017138, having a filing date of Apr. 21, 2020, the disclosure of which is hereby incorporated by reference in its entirety.

BACKGROUND

Processes, such as business and manufacturing processes, may be automated by utilizing a variety of techniques. One such technique may include the utilization of computer-based workflow applications to perform workflow processes associated with the business and manufacturing processes. The workflow processes may include various activities that may be performed to achieve a specified outcome. The computer-based workflow applications may be designed to automate one or more of the activities included in the workflow processes.

BRIEF DESCRIPTION OF DRAWINGS

Features of the present disclosure are illustrated by way of example and not limited in the following figure(s), in which like numerals indicate like elements, in which:

FIG. 11 illustrates a flowchart of an example method for workflow-based dynamic data model and application generation in accordance with an example of the present disclosure.

DETAILED DESCRIPTION

Figure 1:
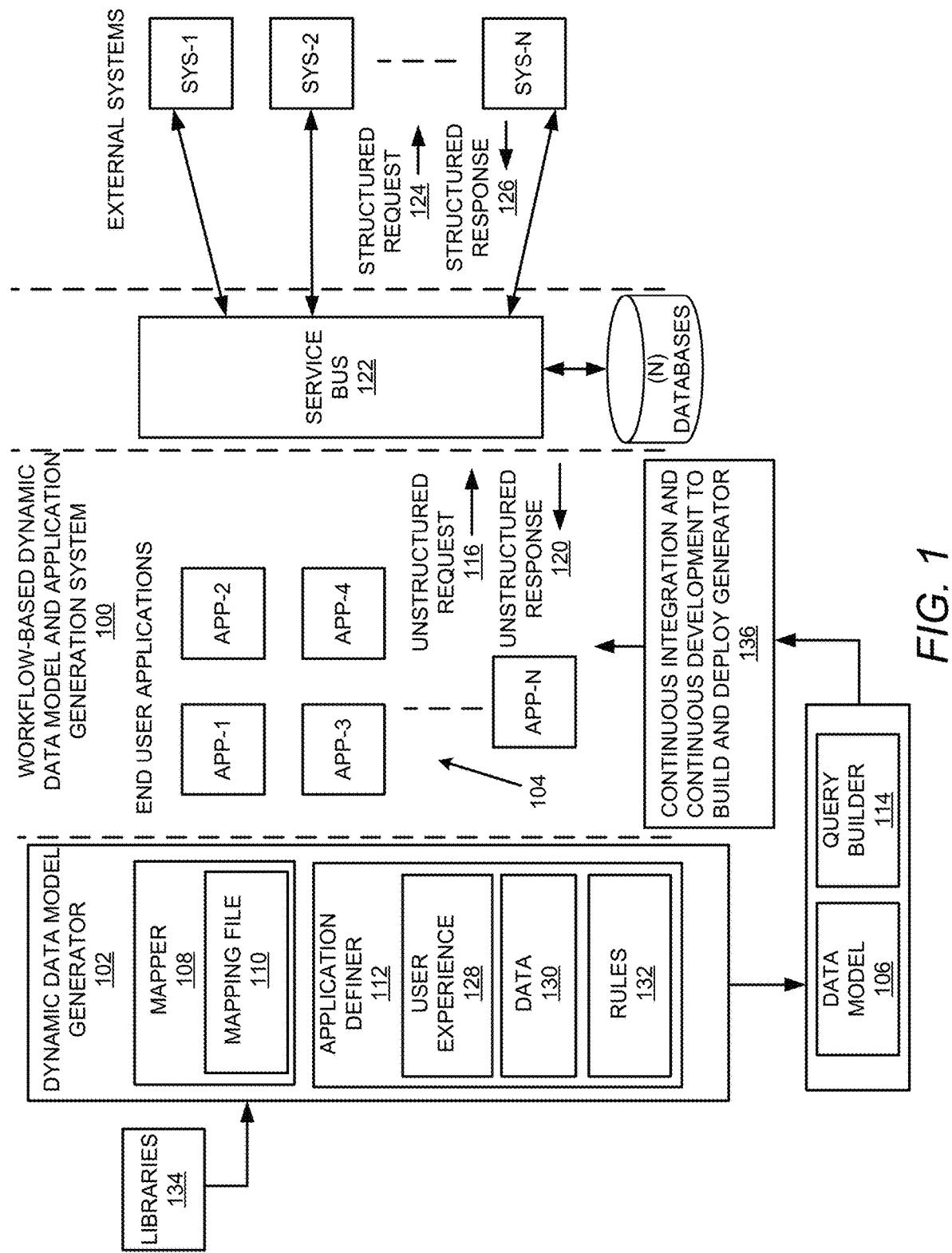
FIG. 1 illustrates a layout of a workflow-based dynamic data model and application generation system in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Workflow-based dynamic data model and application generation systems, methods for workflow-based dynamic data model and application generation, and non-transitory computer readable media having stored thereon machine readable instructions to provide workflow-based dynamic data model and application generation are disclosed herein. The systems, methods, and non-transitory computer readable media disclosed herein provide a mechanism of dynamically handling requests and responses from an application, based on certain configuration parameters, and integration with a service bus to handle data transformation. For example, the systems, methods, and non-transitory computer readable media disclosed herein provide for workflow-based dynamic data model and application generation by dynamically generating and querying a data model declaratively. In this regard, the data model may be declaratively generated and queried based on the definition thereof. For example, for each field of the data model, an application programming interface (API) key may be identified, and each field may be named to thus declare the fields that are to be created for the data model. Further, the data model may be utilized to generate a computer-based workflow application.

A system to generate an application, such as a computer-based workflow application, may utilize an existing data model that may be used to select available fields that may be added, for example, to a user interface to generate an application. In some cases, the existing data model may be customized to include fields relevant to a specific industry, such as a manufacturing industry. Once the available fields are selected and dragged/dropped into the user interface, the application may be generated based on the selected fields.

For such systems, the available fields that may be added to generate an application may be limited. For example, the available fields that may be added to generate an application may include only a limited number of different types of fields. Additionally, the available fields may be limited with respect to types of data that may be utilized (e.g., numeric field, alphanumeric field, etc.).

Thus, an application that is generated may be limited to the available fields of the data model, regardless of whether the data model is an existing data model or a customized data model. Accordingly, it is technically challenging to generate an application that is not limited to the available fields of an associated data model.

Further, applications that may need to integrate with various backend services to send and receive data may need to go through a continuous development cycle to accommodate the integration needs as the data model is dynamic. That is, the data model evolves based on the application's requirements and changes being made in other backend applications. For such an application, it is technically challenging to constantly update the model files, and therefore, configuration files that define the required model at runtime may be used. Additionally, requests may not be limited to JSON requests, and may extend to XMLs and even files to be uploaded and downloaded. Moreover, just sending the request data may not be sufficient. Additional mapping of data such as request headers, query parameters, URL parameters and response headers may be needed. These aspects for such a dynamic application may present technical challenges towards handling of data.

The systems, methods, and non-transitory computer readable media disclosed herein address the aforementioned technical challenges by dynamically generating a data model. For example, the data model may be dynamically generated based on fields that are named and entered by a user in a user interface. These fields may be used to dynamically generate the data model.

The data model may then be mapped to a backend data model of an existing application, if there is a backend data model that an application that is to be generated is to be integrated with. Alternatively, if the application that is to be generated is not to be integrated with another existing application (e.g., the application that is to be generated is a startup application), then the dynamically generated data model may be utilized without mapping to the backend data model. For the application that is generated, the systems, methods, and non-transitory computer readable media disclosed herein may construct the user interface, the data model, the needed application programming interfaces (APIs), and generate the needed code based on rules and actions that are defined. These data elements may then be mapped to external systems and APIs.

The systems, methods, and non-transitory computer readable media disclosed herein further address the aforementioned technical challenges by providing for various client applications to generate the desired request and parse an incoming response, for example, in runtime. Further, the systems, methods, and non-transitory computer readable media disclosed herein may provide for the handling of various types of data transactions, and transformation of a request so as to map headers, request parameters, and query parameters.

In this regard, data tagged to a certain key may be retained. This declarative key may be referred to as a data model. The data model may represent a generic structure used to enable applications form requests at runtime. Two layers may be used to store data, and transform the data. The first layer may be denoted a persistence library and the second may be denoted a dynamic request/response mapper.

With the combination of a declarative data model, the dynamic request/response mapper along with a service bus may provide for the generation of request and responses at runtime, without the need to make any changes to the code and the need to make new releases apart from the configuration file.

The systems, methods, and non-transitory computer readable media disclosed herein may include, amongst other components, a dynamic data model generator, a data persistence library, and a service bus.

The dynamic data model generator may provide a mechanism to create and query the data model for an application without the need to write code to do the same. The data model may be consumed by the data persistence library and the service bus to dynamically create and query a database using the declaration to perform create, read, update, and delete (CRUD) operations.

The data persistence library may represent the data layer that enables frontend applications to perform operations that include saving of application data, offline (no Internet connectivity) support, and syncing of application data to backend servers. In this regard, the data persistence library may provide offline data query support for synced data. The data persistence library may also include a query builder for offline data retrieval, and data syncing of local data to cloud servers. The data persistence library may be configured to choose a preferred database, for example, COUCHBASE, SQLite, REALM, etc., to perform the aforementioned operations.

The service bus may perform the needed orchestration and brokering. In this regard, the service bus may consume the data model as declared by the dynamic data model generator. Further, the service bus may dynamically generate the translations, and orchestrate requests and responses to the desired destinations.

According to an example of implementation of the systems, methods, and non-transitory computer readable media disclosed herein, a user may enter field names at a user interface. The field names may or may not correspond to existing field names of existing applications. The data model may be dynamically generated based on these field names. The dynamically generated data model may be mapped to a backend. In this regard, API keys may be connected to the fields entered by the user.

According to an example of operation of the systems, methods, and non-transitory computer readable media disclosed herein, the data model generator may be used to define and generate the data model. The data model may be defined as API keys relative to fields. For example, an application may include x number of fields, and the same number of API keys for the fields may be used for channeling communication via the service bus. A mapping file as disclosed herein may be created for the API keys, and include a specified number of APIs that are to be invoked.

The mapping file as disclosed herein may be generated by a data mapper, and may be consumed by the service bus. The service bus may include a mapping engine to consume the mapping file, and to dynamically create structured requests and unstructured responses as disclosed herein.

The application that is generated may include the persistence library that includes a query builder. The query builder may query the data model. The persistence library may consume the data model and may communicate with external systems or a backend database via the service bus. In this regard, the persistence library, via the query builder, may generate unstructured requests, send the unstructured requests to the service bus, and the service bus may invoke, per the mapping file, APIs. The service bus may perform the appropriate translations to generate structured requests, receive structures responses from the external systems or backend database, convert the structured responses to unstructured responses, and return the unstructured responses to the persistence library.

For the systems, methods, and non-transitory computer readable media disclosed herein, the elements of the systems, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example workflow-based dynamic data model and application generation system (hereinafter also referred to as "system 100").

Referring to FIG. 1, the system 100 may include an data model generator 102 that is executed by at least one hardware processor (e.g., the hardware processor 1002 of FIG. 10, and/or the hardware processor 1204 of FIG. 12) to ascertain, for an application 104 (e.g., applications 1-n shown in FIG. 1) that is to be generated, a plurality of fields that are declared. The data model generator 102 may generate, based on the plurality of declared fields, a data model 106. The data model 106 may include a plurality of application programming interface (API) keys associated with the plurality of declared fields.

According to examples disclosed herein, the data model generator 102 may receive, for the plurality of declared fields, specifications of the plurality of declared fields that include names of the plurality of declared fields.

According to examples disclosed herein, the names of the plurality of declared fields may be different from existing names of fields of applications.

According to examples disclosed herein, the data model generator 102 may receive, for the plurality of declared fields, specifications of the plurality of declared fields that include types of the plurality of declared fields.

A data mapper 108 that is executed by at least one hardware processor (e.g., the hardware processor 1002 of FIG. 10, and/or the hardware processor 1204 of FIG. 12) may generate, based on the data model 106, a mapping file 110 to map a plurality of APIs that are to be invoked relative to the API keys.

An application definer 112 that is executed by at least one hardware processor (e.g., the hardware processor 1002 of FIG. 10, and/or the hardware processor 1204 of FIG. 12) may generate, based on the data model 106 and the mapping file 110, the application 104.

A query builder 114 that is executed by at least one hardware processor (e.g., the hardware processor 1002 of FIG. 10, and/or the hardware processor 1204 of FIG. 12) may generate, based on the data model 106 and the mapping file 110, a plurality of unstructured requests 116 to query the data model 106 for offline (e.g., utilizing a local database) or online (e.g., utilizing an external system) data retrieval.

Figure 4:
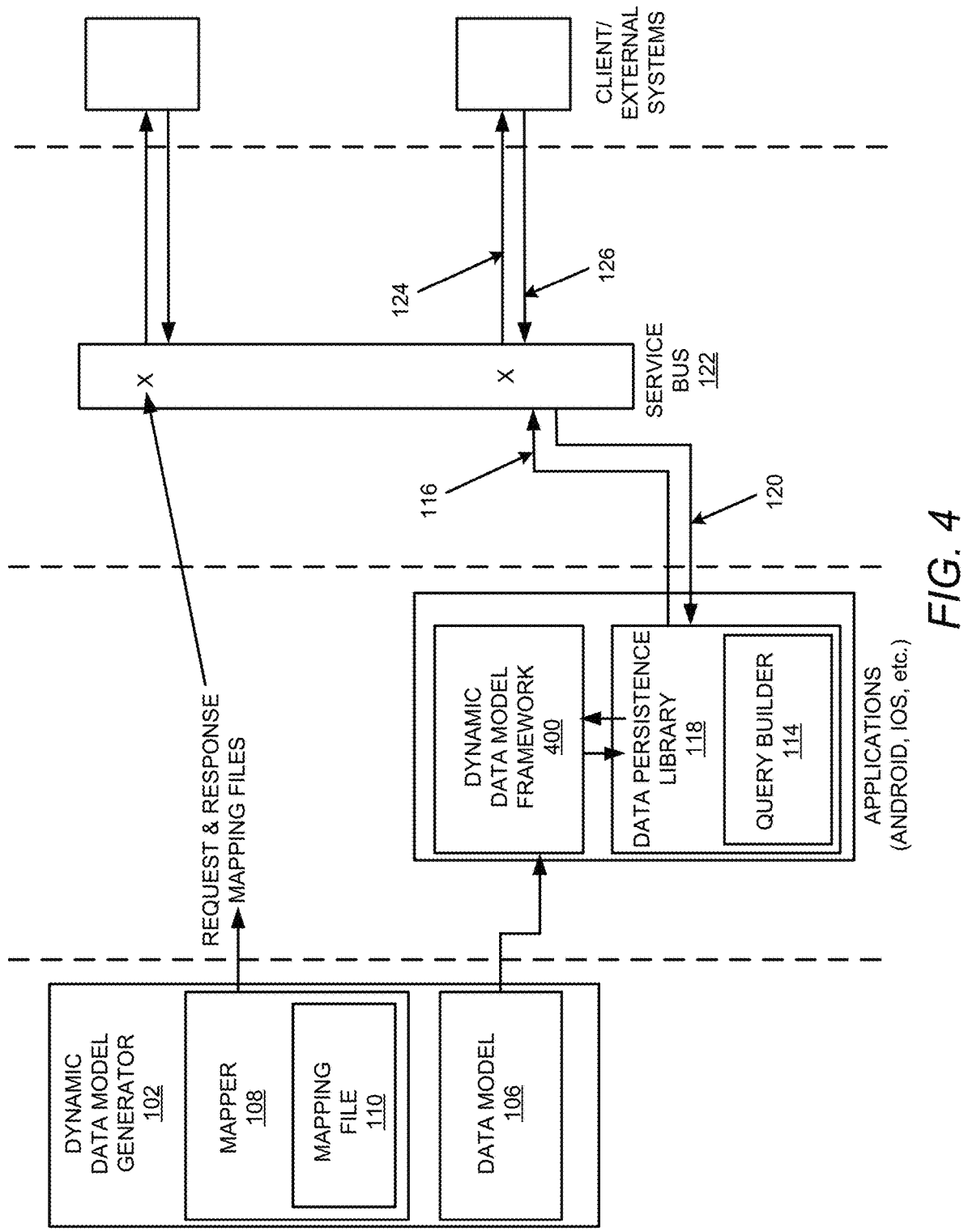
FIG. 4 illustrates further details of operation of the dynamic data model generator, the data persistence library, and the service bus of the workflow-based dynamic data model and application generation system of FIG. 1 in accordance with an example of the present disclosure.

The application 104 may include a persistence library 118 to analyze the data model 106 (e.g., see FIG. 4). The persistence library 118 may generate, based on the analysis of the data model 106, the plurality of unstructured requests 116. Further, the persistence library 118 may receive, in response to the plurality of unstructured requests 116, unstructured responses 120.

A service bus 122 that is executed by at least one hardware processor (e.g., the hardware processor 1002 of FIG. 10, and/or the hardware processor 1204 of FIG. 12) may analyze the mapping file 110 to perform the plurality of unstructured requests 116. For example, the service bus 122 may receive the plurality of unstructured requests 116. The service bus 122 may translate, based on the mapping file, the plurality of unstructured requests 116 into a plurality of structured requests 124 for mapping to an existing data model. The service bus 122 may translate, based on the mapping of the plurality of structured requests 124 to the existing data model, received structured responses 126 corresponding to the plurality of structured requests 124 into the unstructured responses 120. Further, the service bus 122 may forward the unstructured responses 120 to the persistence library 118.

According to examples disclosed herein, the unstructured requests may include unstructured JavaScript Object Notation (JSON) format requests, and the unstructured responses may include unstructured JSON format responses. Similarly, the structured requests may include structured JSON format requests, and the structured responses may include structured JSON format responses.

Operation of the system 100 is described in further detail with reference to FIGS. 1-9.

Referring to FIGS. 1 and 4, as disclosed herein, the dynamic data model generator 102 may utilize the application definer 112 to generate the application 104. The application 104 may include different features such as user experience, etc. For the example of FIG. 1, end user applications may include, for example, App-1, App-2, etc. The applications (e.g., mobile, web, etc.) may include the persistence library 118 to consume the data model 106. The persistence library 118 may receive the data model 106 and communicate the data model 106 via the service bus 122 to external systems. Each of the end user applications may include a persistence library.

The dynamic data model generator 102 may create workflows. The workflows may be implemented by an application 104 that is to be generated. A workflow may include a step, where the step may represent a set of fields. For example, a step may include capturing an image, and a field may include a camera button to capture the image. Other fields may include data type fields, text fields, calendar fields, etc. The fields may be assigned any name that may be available (e.g., a name that is not being used by another field that performs a different function).

The workflows may be dynamically configured, and may be consumed by various applications that may operate on different platforms, such as (OS™ Android™, etc.

A workflow may include, for example, step-1, step-2, . . . , step-n, etc. Step-1 may include obtaining first name, last name, date of birth (DOB), step-2 may include obtaining gender, and address. When these steps are configured, and a build command is initiated, the application 104 may be generated, and on the fly, screens may be rendered to include step-1 including first name, last name, DOB, step-2 including gender, and address, etc.

As disclosed herein, the dynamic data model generator 102 may include the application definer 112. The application definer 112 may include definition of user experience 128, data 130, rules 132, and actions. When the dynamic data model generator 102 is launched, the dynamic data model generator 102 may request the corresponding APIs that the definition of the user experience 128 is to be mapped to. For example, a user interface may be created to obtain information such as first name, last name, DOB, etc.

The data 130 with respect to the application definer 112 may include data associated with any type of a field that is entered by a user. For example, the data 130 may include a field name and/or field type, such as photos, documents, names, etc.

The rules 132 with respect to the application definer 112 may include rules associated with operation of an application that is to be generated. For example, for a driver's license scan library that may provide functionality such as reading all fields of a driver's license, optical character recognition of data from the fields, barcode scanning, face matching, etc., with respect to face matching, a rule may specify that a match occurs to an existing image when a match percentage exceeds a specified threshold value (e.g., 70%).

The data model 106 may represent a universal data model that is not pre-defined on the backend, but may still support all of the needed interactions. The data model 106 may be usable, through mapping, beyond the boundaries of the system 100. Thus, fields may be given any name (e.g., a name that is not already being used) in the application definer 112. In order to define the data model 106, a user may enter information that they want for the application 104, and based on the information, the data model 106 may be defined declaratively. In the data model generator 102, API keys may be placed in data fields that are defined (e.g., the API keys may represent unique identifier). Further, queries may be defined using the unique identifiers. This information may then be consumed by the persistence library for each application.

With respect to the data model 106, examples of data model definitions may be specified as follows to support various use cases.

For example, two different fields for mapping API key to be used for request and API key to be used for response may be specified as follows:

```
{
    "unique_id": "1213_asd",
    ....
    "request_api_key": "person_name",
    "response_api_key": "user_name"
    ....
}
```

With respect to the "request_api_key", this API key may be used to send data when making a request. The api_key for legacy support may be kept and client applications may need to handle it using some flag in their config file/wfe.json. With respect to the "response_api_key", this API key may be used to set data from an incoming API response. The field value may be altered by response_api_key only as opposed to the previous functionality where api_key match would allow setting the field value.

With respect to concatenation of API keys value, the following function may be utilized:

```
{
    "unique_id": "1213_asd",
    ....
    "request_api_key": "name",
    "response_api_key": "firstname || middlename || lastname"
    ....
}
```

If the response_api_key has multiple values separated by a double pipe, then the value that will be set on the field will be the concatenation of the values received under the specified keys. This feature is specific to the attribute response_api_key.

With respect to mapping of response and request values to multiple api_keys, the following functionality may be utilized:

```
{
    "unique_id": "1213_asd",
    ....
    "request_api_key": "name | firstname | user_first_name",
    "response_api_key": "firstname | middlename | lastname"
    ....
}
```

If the api_key and response_api_key has multiple values separated by a single pipe, then the value of the field may be mapped to multiple API keys mentioned by the pipe separator.

Dynamic API keys may be used in repeatable blocks, list and table implementations as follows.

```
{
    "unique_id": "1213_asd",
    ....
    "request_api_key": "data[*].start_time",
    "response_api_key": "holidays[*].start_time"
    ....
}
```

In certain cases, API keys may need to have dynamic elements attributed to them. This may be used when data needs to be bound to a list, table or repeatable block, where the key structure remains the same. There may be dynamic elements such as the loop index or the nesting of the keys. These may be represented as follows:

Dot ".": The dot annotation may be used to define nesting of object keys.

Asterisk "[*]": The asterisk annotation may be used to define places where the index of the API key is dynamic. This may be used to denote objects of an array.

The API Config JSON may be specified as follows:

```
{
    "api_response": [
        {
            "id": "dcss/saveletterofoffer",
            "url": "http://xyz.com/dcss/saveletterofoffer",
            "methodType": "POST",
            "requestType": "application/json",
            "urlParams": [
            ],
            "queryParams": [
            ],
            "headerParams": [
            ],
```

```
        "requestBody": [
            "api_key1",
            "api_key2",
            "api_key3"
        ]
      }
    ]
  }
```

This may be achieved by either adding a new config block or by using additional parameters. The following will be captured in the configuration,
- id: The id used in the event config.
- url: Endpoint url to be called.
- methodType: The following are the accepted method type values GET, POST, PUT, PATCH, DELETE
- requestType: Currently the type to be supported is application/json.
- urlParams: List of request_api_keys to be sent as URL Params.
- queryParams: List of request_api_keys to be sent as query Params.
- headerParams: List of request_api_keys to be sent as header Params.
- requestBody: List of request_api_keys to be sent in request body.

Referring again to FIG. 1, the libraries 134 may provide for enrichment of the system 100. For example, a library may include an ID verification library to provide ID verification services. This library may include components that are prebuilt for iOS™, Windows™, etc.

According to another example, a library may include a driver's license scan library. In order to generate a driver's license scanning application, such a driver's license scan library may be dragged and dropped to implement scanning of a driver's license. The driver's license scan library may provide other functionality such as reading of all fields of a driver's license, optical character recognition of data from the fields, barcode scanning, face matching, etc.

According to another example, a library may provide for the creation of a multiscreen application on a touch enabled device that may provide for sharing of data between applications.

The libraries 134 may be independent of technologies utilized with respect to the databases of the system 100, which may thus provide for broader application of the dynamic data model generator 102 as disclosed herein.

For FIG. 1, a continuous integration and continuous development (CICD) to build and deploy generator 136 may generate one or more of the applications (e.g., such as the application 104) for various platforms (iOS™ Android™, etc.). For example, referring to FIG. 3, the applications may include iOS™, Android™, kiosk based, web based, etc., types of applications.

The CICD to build and deploy generator 136 may receive information with respect to a user interface for the application 104, the data model 106, the API for the application 104, and the code for the application 104. The CICD to build and deploy generator 136 may integrate the received information to generate the application 104. For example, as disclosed herein with reference to FIGS. 1, 3, and 4, the application 104 may be operable on a variety of platforms such as IOS™ Android™, etc., as well as on a variety of devices such as phones, tablets, smart watches, etc.

Figure 2:
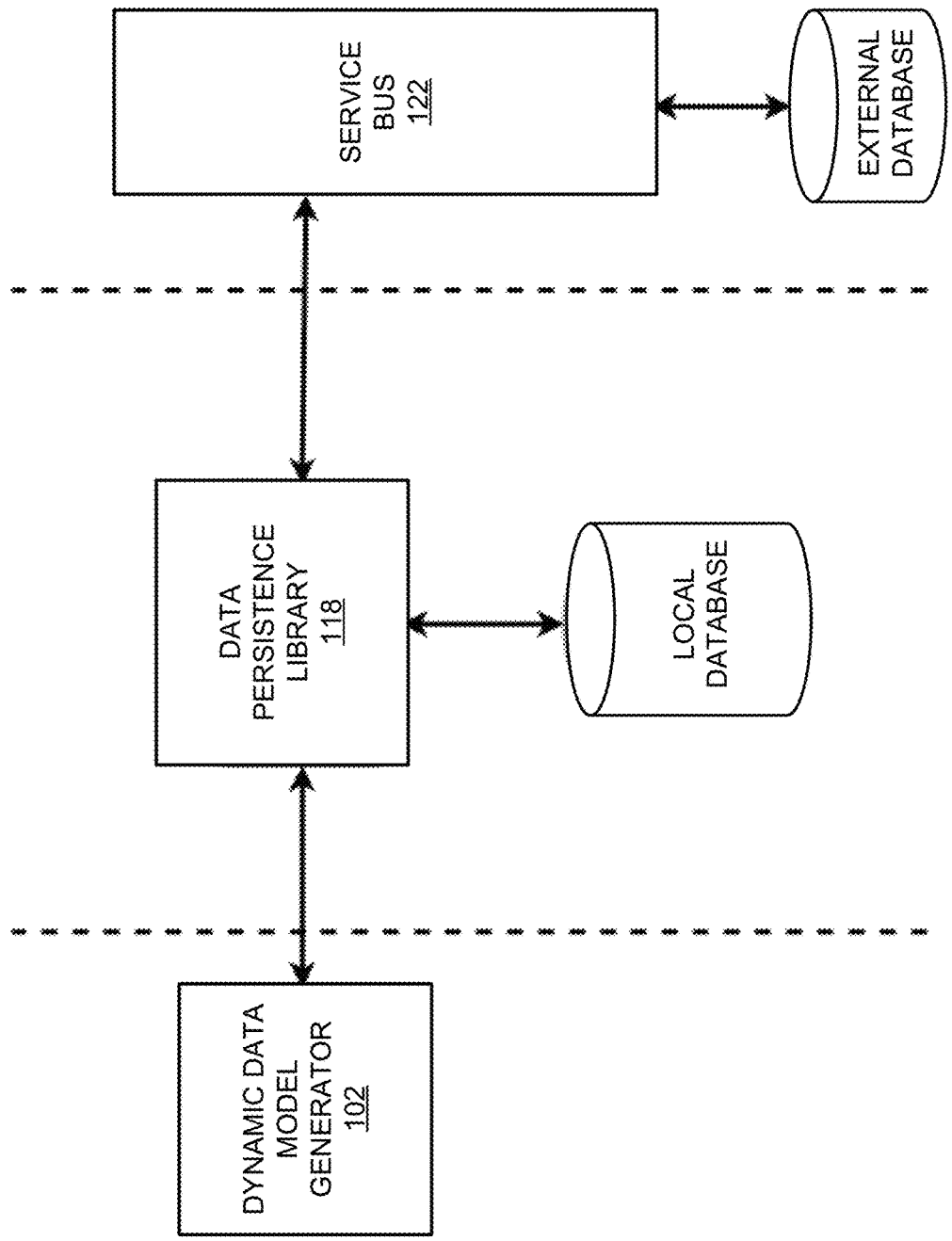
FIG. 2 illustrates a logical organization of a dynamic data model generator, a data persistence library, and a service bus of the workflow-based dynamic data model and application generation system of FIG. 1 in accordance with an example of the present disclosure.

FIG. 2 illustrates a logical organization of the dynamic data model generator 102, the data persistence library 118, and the service bus 122 of the system 100 in accordance with an example of the present disclosure.

Referring to FIG. 2, the dynamic data model generator 102, the data persistence library 118, and the service bus 122 may be logically organized as shown to communicate with each other. Further the persistence library 118 may communicate with a local database as shown for offline query analysis as disclosed herein, and the persistence library 118 may communicate with an external database via the service bus 122 for online query analysis as disclosed herein.

Figure 3:
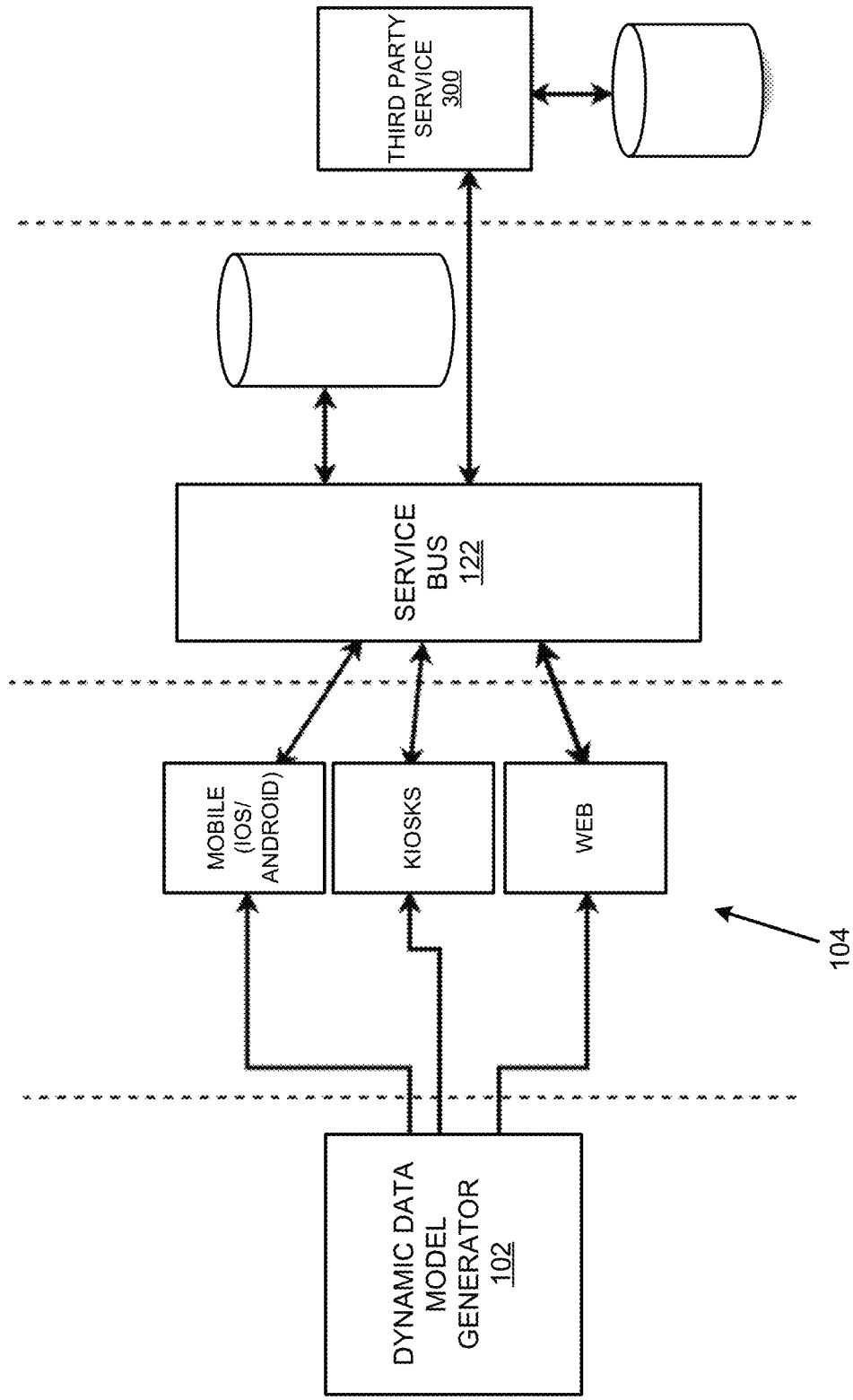
FIG. 3 illustrates a logical organization of the dynamic data model generator, a front end application, and the service bus of the workflow-based dynamic data model and application generation system of FIG. 1, and a third party service, in accordance with an example of the present disclosure.

FIG. 3 illustrates a logical organization of the dynamic data model generator 102, a front end application (e.g., the application 104), the service bus 122 of the system 100, and a third party service 300. In this regard, the third party service 300 may represent an external system that is being queried.

FIG. 4 illustrates further details of operation of the dynamic data model generator 102, the data persistence library 118, and the service bus 122 of the system 100 in accordance with an example of the present disclosure.

Referring to FIG. 4, the data mapper 108 of the dynamic data model generator 102 may provide for the creation of a set of API keys. The data mapper 108 may create request and response mapping files (e.g., first name may map to user details.first name, within user details there is profile, and within profile there is a first name). In this regard, the API keys may be defined, and then using the mapping file 110, mapping may be performed to translate from unstructured to a structured request, and from a structured to an unstructured response.

A mapping template may include an indication of which field on a structured request or response (e.g., date) is to be mapped with a corresponding field on an unstructured request or response. In some examples, mapping may not be one-to-one. For example, operations may be defined that take fields in a schema, concatenate the fields, and thereafter map these concatenated fields as needed.

The dynamic data model generator 102 may generate the data model 106, which may be utilized to generate the application 104. When application 104 receives the data model 106, based on an associated request and associated API keys, a dynamic data model framework 400 may create an unstructured request (e.g., a flat JSON), and send the unstructured request to the data persistence library 118.

The data persistence library 118 may consume a workflow. According to an example, the data persistence library 118 may be implemented using an offline database, such as COUCHBASE™. In this regard, for the implementation using COUCHBASE, a JSON file may save all application steps into smaller divided documents in a database. The documents may represent records. Each step in a workflow may become a document.

The data persistence library 118 may forward the unstructured request (e.g., flat JSON) to the service bus 122, for example, to invoke a third party API, such as map API.

With respect to offline functionality of the system 100 as disclosed herein, the data persistence library may store a data model instance in a JSON file. The JSON file may be divided into smaller chunks to facilitate operation of the application 104 on a mobile device that may include limited available memory. In this regard, queries as disclosed herein may be performed utilizing the smaller chunks of the JSON file.

The JSON file may be divided into smaller chunks by dividing the JSON file into steps and fields. For example, the JSON file may be structured using a hierarchy that includes an application that has multiple workflows, where each workflow includes application steps that may represent individual screens, and each step may include fields (e.g., text boxes, drop downs, etc.).

All of the documents associated with a particular application may be defined in the JSON file.

With respect to offline operation of the system 100, according to an example, the application 104 that is being generated may include a login page with two fields (e.g., username, and password), and a login button to invoke login API. Since these two fields and the login button are not present in an existing data model, API keys associated with these two fields and the login button may be sent to the data persistence library 118, which may send this information to the service bus 122. However, since the system 100 is operating in an offline mode, this information may be retained at the data persistence library 118 until the system 100 includes an online connection where this information may be sent to the service bus 122. Thus, the data persistence library 118 may obtain data, cache the data, and send the data to the service bus 122 if an API is invoked. Further, in an offline environment, the data persistence library 118 may shield the system 100 to permit other operations of the system 100 to be performed as needed.

The data persistence library 118 may include the query builder 114. The query builder 114 may support certain functionality of the system 100, for example, when the system 100 is operating in offline (uses own database) or online modes (communicates with service bus). Thus, by configuration, queries may be input, the persistence library 118 may consume the queries, and thus a database may be queried (offline or online).

The service bus 122 may consume mapping files. The service bus 122 may facilitate the performance of translation and transformation from the structured request to the unstructured request, and vice versa. The purpose of the translation may include facilitating communication with a system (e.g., a Google™ application). The service bus 122 may send a structured request to a client (e.g., an external system), receive a response that is structured, convert the received response to an unstructured response, and forward the unstructured response to the data persistence library 118. The request may be sent in real time, or according to a schedule.

For example, assuming that the request sent to the service bus 122 includes first name as "ABC", a returned response may include last name as "XYZ", which may be utilized as needed without the need to determine actual field names.

With respect to operation of the service bus 122, an application 104 that is being generated may include a login page with two fields (e.g., username, and password), and a login button to invoke login API. Since these two fields and the login button are not present in an existing data model, API keys associated with these two fields and the login button may be sent to the data persistence library 118, which may send this information to the service bus 122. Assuming that information sent to the service bus 122 includes a user first name, a user last name, a DOB, the username, password, etc., the service bus 122 may extract the username and password from this information. The service bus 122 may execute mapping logic to map the unstructured request to a structured request (and vice-versa).

Figure 5:
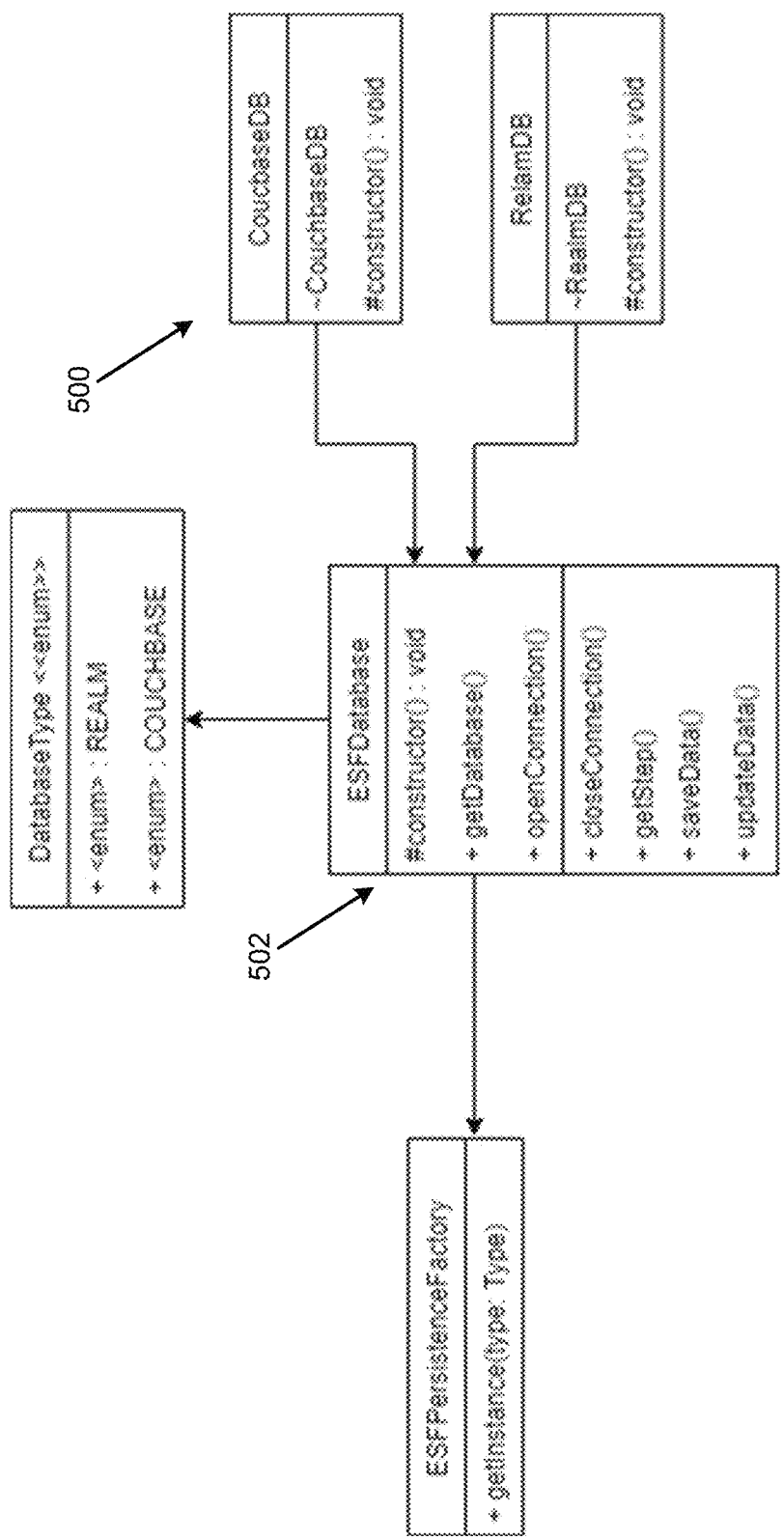
FIG. 5 illustrates a logical flow of a persistence factory design of the workflow-based dynamic data model and application generation system of FIG. 1 in accordance with an example of the present disclosure.

FIG. 5 illustrates a logical flow of a persistence factory design of the system 100 in accordance with an example of the present disclosure.

Referring to FIG. 5, at 500, the data persistence library 118 may be configured to choose a preferred database, for example, COUCHBASE™, SQLite™ REALM™, etc., to perform various operations as disclosed herein. At 502, once a database is selected, further processing may proceed to getdatabase( ), then openConnection( ), then closeConnection( ), then getStep( ), then saveData( ), then updateData( ).

Figure 6:
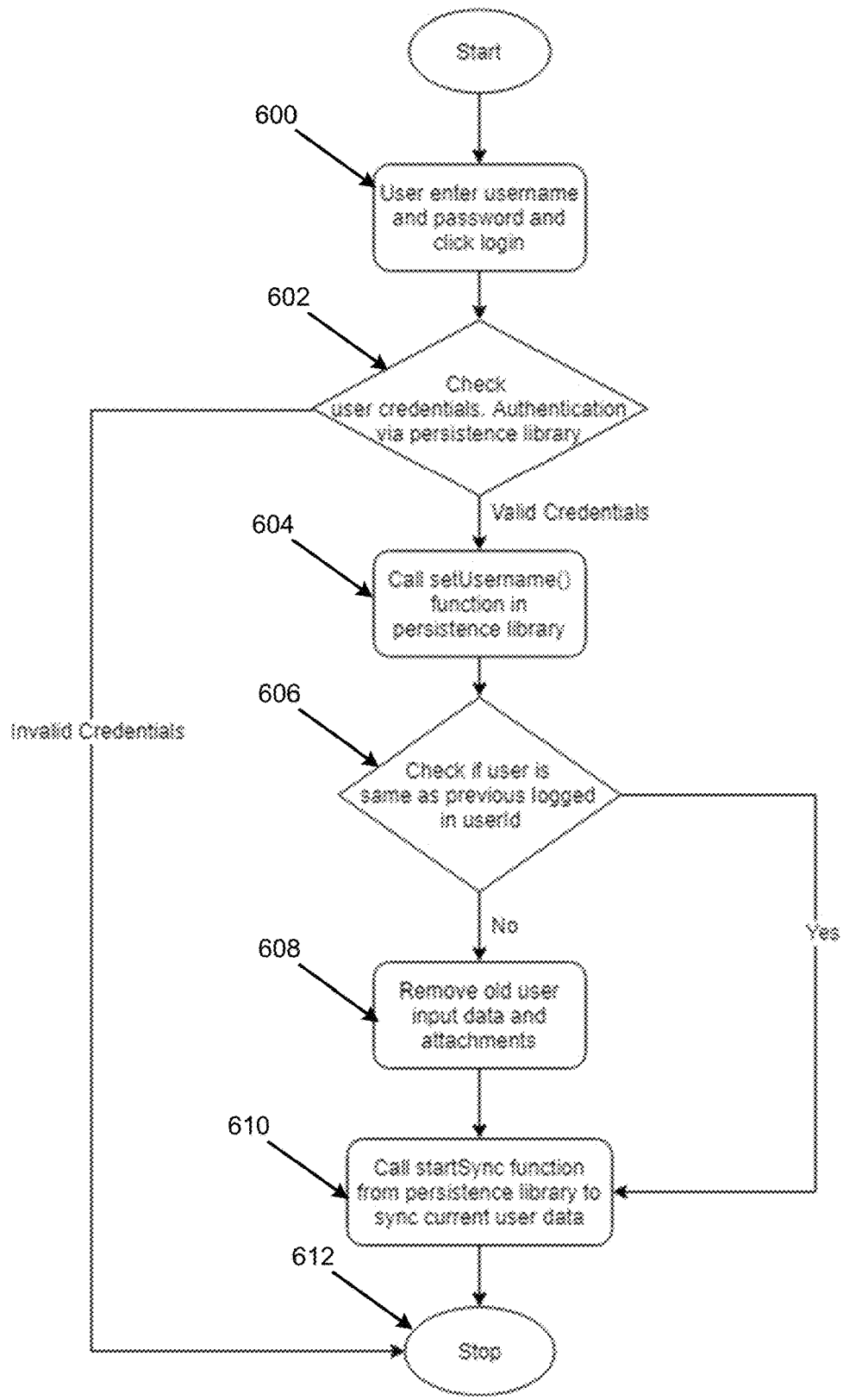
FIG. 6 illustrates a logical flow of a data persistence library function of the workflow-based dynamic data model and application generation system of FIG. 1 in accordance with an example of the present disclosure.

FIG. 6 illustrates a logical flow of a data persistence library function of the system 100 in accordance with an example of the present disclosure. In this regard, with respect to offline and online functionality, a user's credentials may be saved. For offline functionality, the saved user credentials may be utilized. Otherwise, for online functionality, the saved user credentials may be verified by an external system.

Referring to FIG. 6, at 600, a user may enter a username and password, and select a login button.

At 602, the data persistence library 118 may analyze the user credentials, and authenticate the user once the user credentials are verified.

At 604, if the credentials entered at 602 are valid, the "setUsername( )" function may be called in the persistence library 118.

At 606, a determination may be made as to whether the user is the same as a previously logged user based on a "user ID" comparison between the user and the previously logged user.

At 608, based on a determination that the user is not the same as the previously logged user, the previously logged user input data and attachments may be removed.

At 610, a "startSync" function may be called from the persistence library 118 to sync current user data. In this regard, with respect to block 606, based on a determination that the user is the same as the previously logged user, processing may proceed from block 606 to block 610.

Figure 7:
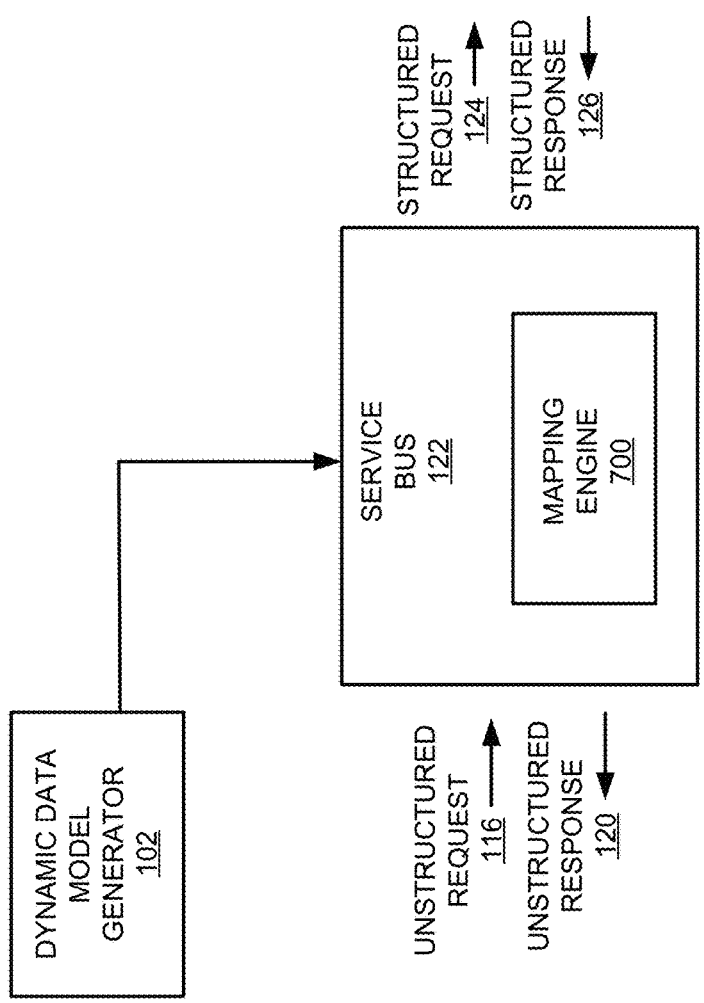
FIG. 7 illustrates operation of a mapping engine of the workflow-based dynamic data model and application generation system of FIG. 1 in accordance with an example of the present disclosure.

FIG. 7 illustrates operation of a mapping engine of the system 100 in accordance with an example of the present disclosure.

Referring to FIG. 7, a mapping engine 700 of the service bus 122 may obtain the mapping file 110 generated by the data mapper 108 of the dynamic data model generator 102. The mapping engine 700 may utilize a mapping template to generate requests. The mapping file 110 may define the mapping between unstructured and structured requests/responses. The mapping engine 700 may consume the mapping file 110 and dynamically create the translations between the unstructured and structured requests/responses. For example, the data mapper 108 may indicate unstructured request (e.g., first name, last name, DOB, and mailing address). A structured request (e.g., at an external system) may indicate under customer details, send me first name and last name, under name and address, send me address line 1, address line 2, city, state, and zip, etc. When the mapping is created, a structured request may be created. For the structured request, a root element may include customer details, within the request, the first name from the unstructured request may be mapped to the structured request, address line 1 from the unstructured request may be mapped to mailing address line 1, etc. The mapping engine 700 may thus utilize the mapping file 110 to create structured requests that are sent to an external system.

With respect to the mapping engine 700, a mobile application may include information that may be obtained from multiple sources. For example, a mobile application may include three drop downs such as select country from a list of countries, select a state from a list of states for the selected country, select city from a list of cities for the selected state. In this regard, three APIs may be invoked, where a first API may be invoked to obtain countries, a second API may be invoked to obtain states, and a third API may be invoked to obtain cities. The mapping engine 700 may implement such a process with a single API based on API chaining. For example, a single internal API may be invoked, and the mapping file may be implemented such that when the API is invoked, a response is received (e.g., RESP1), this response may now be translated into a REQUEST 2 for another API, once another response (e.g., RESP2) is obtained, this response may now be translated into a REQUEST 3 for another API, and finally a response from REQUEST 3 may be returned.

Figure 8:
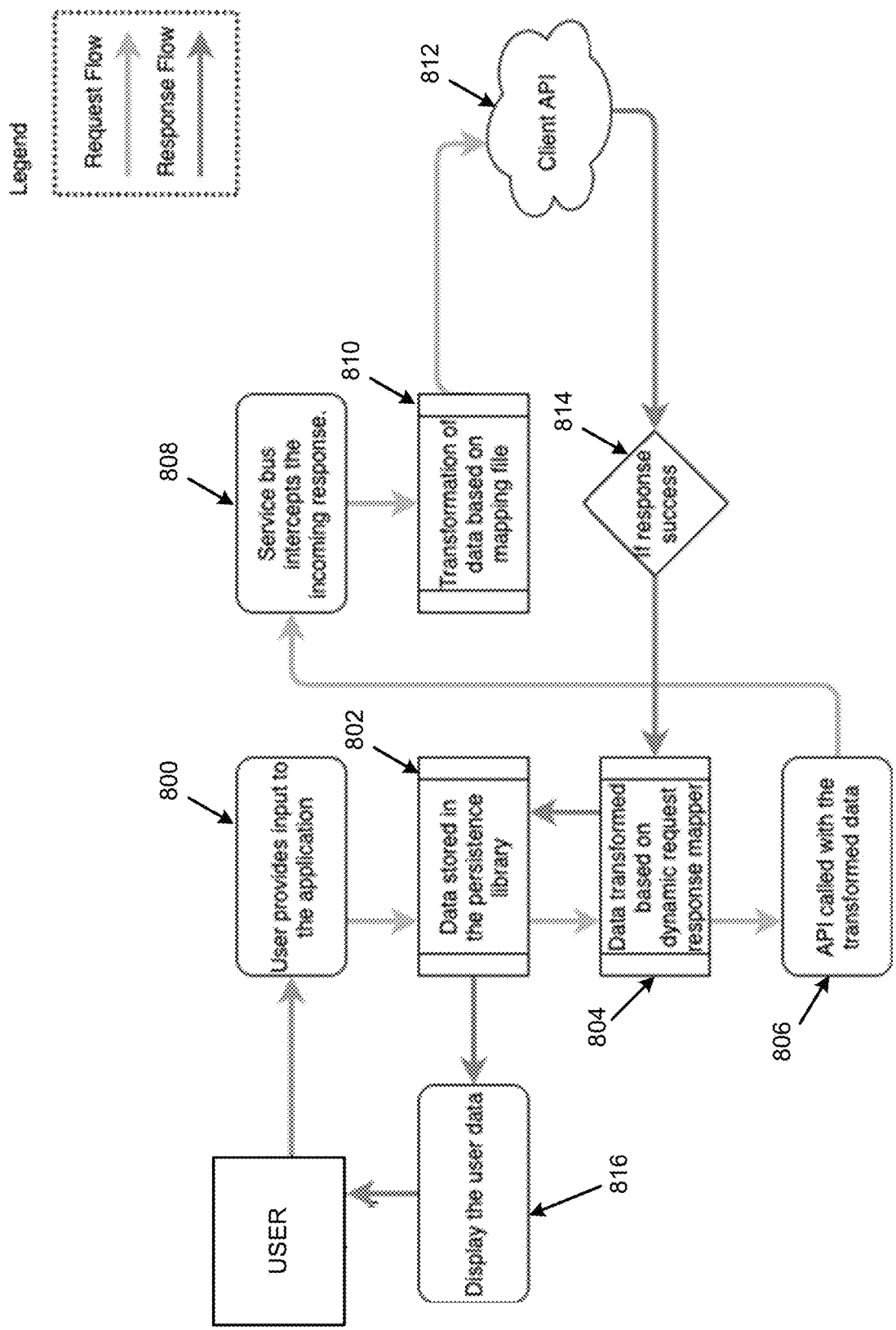
FIG. 8 illustrates a flow of data associated with the workflow-based dynamic data model and application generation system of FIG. 1 in accordance with an example of the present disclosure.

FIG. 8 illustrates a flow of data associated with the system 100 in accordance with an example of the present disclosure.

Referring to FIG. 8, at 800, a user may provide an input to an application, for example, via visible and editable fields.

At 802, entered data may be stored in the persistence library 118.

At 804, data may be transformed based on the dynamic request/response mapper 108.

At 806, an API may be called with the transformed data.

At 808, the service bus 122 may intercept the incoming response.

At 810, the data may be transformed based on the mapping file 110.

At 812, further processing may proceed to a client API.

If the response is a success as determined at 814, at 804 data may be transformed based on the dynamic request/response mapper 108.

At 816, user data may be displayed from block 802.

Figure 9:
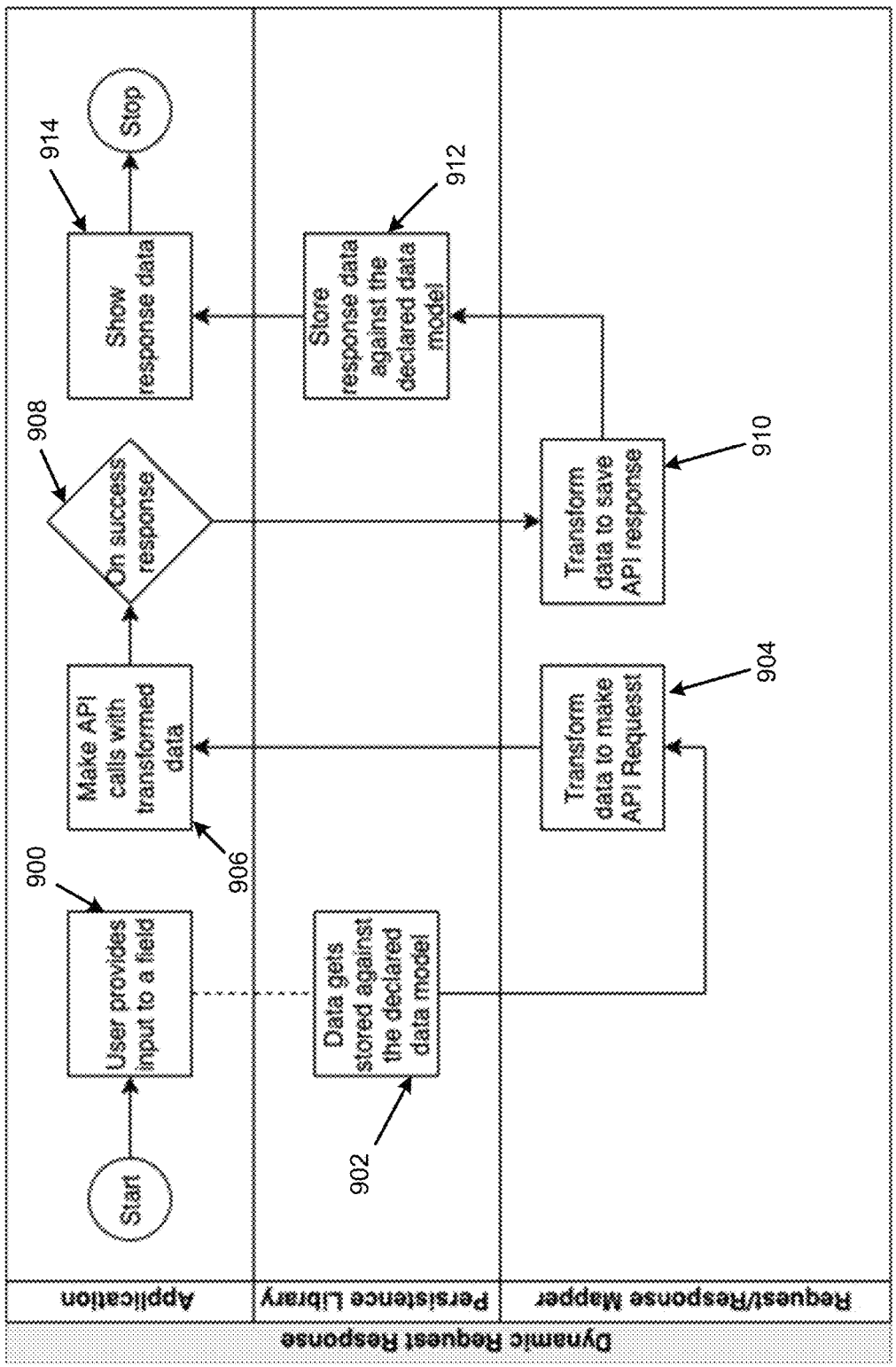
FIG. 9 illustrates a dynamic request and response functionality of the workflow-based dynamic data model and application generation system of FIG. 1 in accordance with an example of the present disclosure.

FIG. 9 illustrates a dynamic request and response functionality of the system 100 in accordance with an example of the present disclosure.

Referring to FIG. 9, with respect to dynamic request and response, the dynamic request and response capability of the system 100 provides for the creation of requests and response at runtime. This feature of the system 100 provides for transformation of request and response data. In this regard, the mapper 108 may operate with the persistence library that enables a dynamically generated application to make API calls in runtime.

At 900, a user may provide certain inputs via visible and editable fields.

At 902, the entered data may be stored within the persistence library 118 against their respective declared data models.

At 904, the data may then be transformed by the dynamic request/response mapper 108 to generate data based on the user input and the declared data model name.

At 906, the transformed data may be used by the application to perform API calls.

At 908, the data received from a successful response may then be sent back to the dynamic request/response mapper 108 that transforms, at 910, the data back into a pre-declared data model and value format for the application to use it at a later stage.

At 912, the response data may be stored against the declared data model.

At 914, the response data may be displayed as needed.

With respect to the service bus 122, the service bus 122 may provide for translation of various API calls made from a client application. The layer associated with the service bus 122 may be driven by mapping files that allows for transformation of application made requests into the desired format for an API to consume.

The layer associated with the service bus 122 may include a first responsibility where after a request is made by the application with an array of values, the request is intercepted by the service bus 122. The service bus 122 may then use the incoming values to form proper API requests by mapping the headers, URL parameters and request parameters. The layer associated with the service bus 122 may also be responsible for additional transformations such as converting requests into XML, multipart, etc. Further, the layer associated with the service bus 122 may then call the API to receive a response, which if successful, may go through the same process of transformation and mapping before sending the request back to the application.

Figure 10:
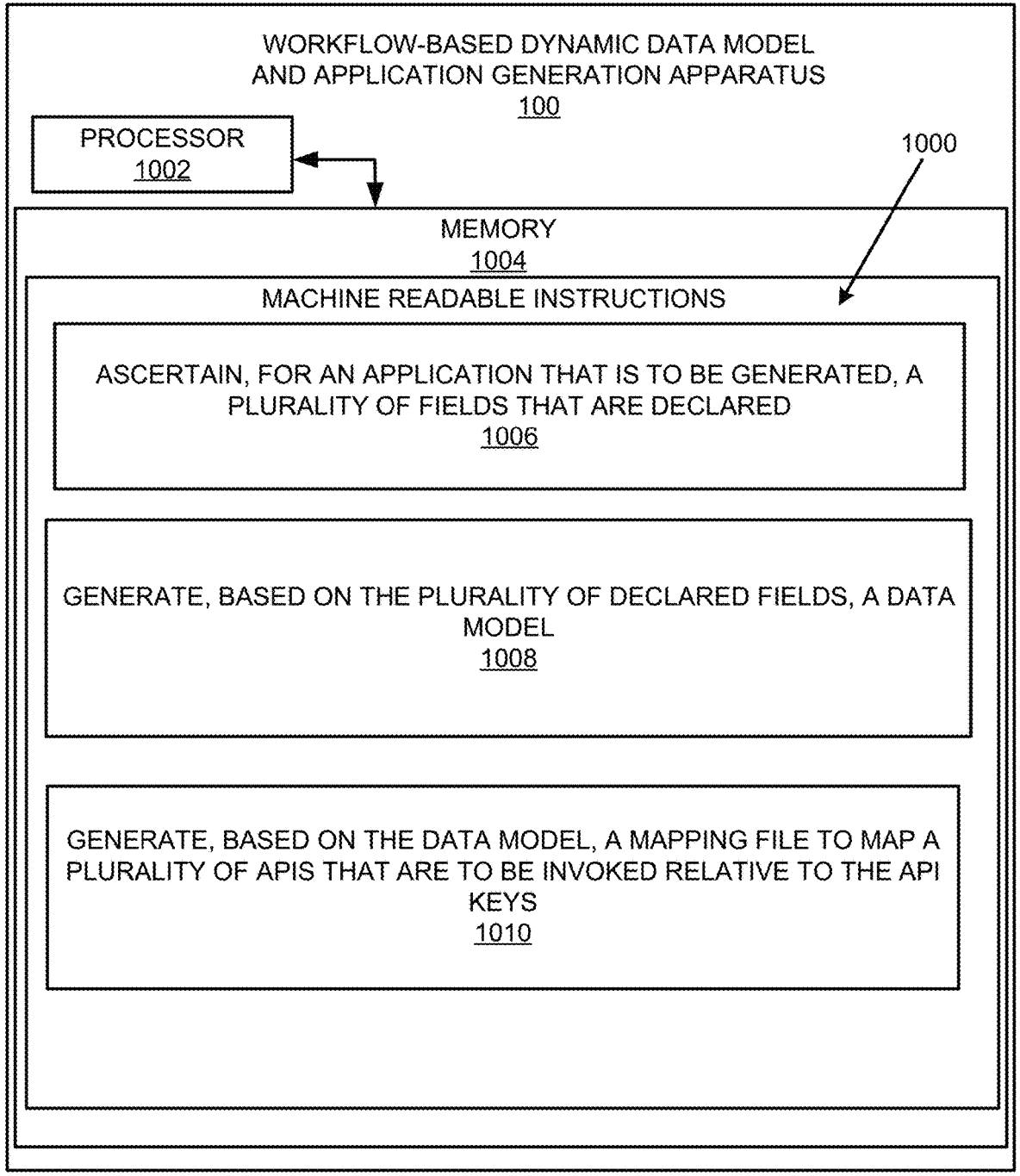
FIG. 10 illustrates an example block diagram for workflow-based dynamic data model and application generation in accordance with an example of the present disclosure.
Figure 12:
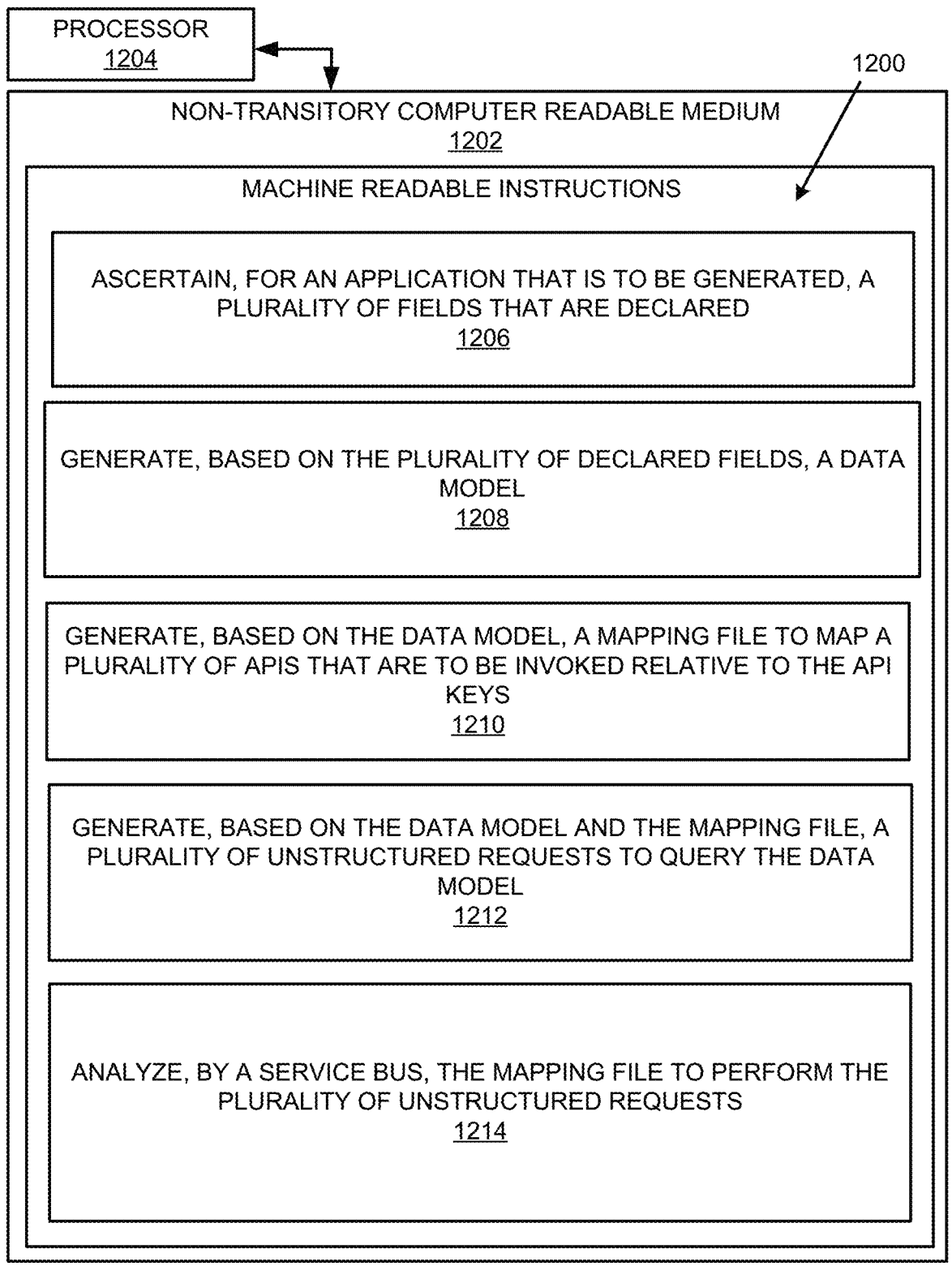
FIG. 12 illustrates a further example block diagram for workflow-based dynamic data model and application generation in accordance with another example of the present disclosure.

FIGS. 10-12 respectively illustrate an example block diagram 1000, a flowchart of an example method 1100, and a further example block diagram 1200 for workflow-based dynamic data model and application generation, according to examples. The block diagram 1000, the method 1100, and the block diagram 1200 may be implemented on the system 100 described above with reference to FIG. 1 by way of example and not of limitation. The block diagram 1000, the method 1100, and the block diagram 1200 may be practiced in other systems. In addition to showing the block diagram 1000, FIG. 10 shows hardware of the system 100 that may execute the instructions of the block diagram 1000. The hardware may include a processor 1002, and a memory 1004 storing machine readable instructions that when executed by the processor cause the processor to perform the instructions of the block diagram 1000. The memory 1004 may represent a non-transitory computer readable medium. FIG. 11 may represent an example method for workflow-based dynamic data model and application generation, and the steps of the method. FIG. 12 may represent a non-transitory computer readable medium 1202 having stored thereon machine readable instructions to provide workflow-based dynamic data model and application generation according to an example. The machine readable instructions, when executed, cause a processor 1204 to perform the instructions of the block diagram 1200 also shown in FIG. 12.

The processor 1002 of FIG. 10 and/or the processor 1204 of FIG. 12 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1202 of FIG. 12), such as hardware storage devices (e.g., RAM (random access memory), ROM (read only memory), EPROM (erasable, programmable ROM), EEPROM (electrically erasable, programmable ROM), hard drives, and flash memory). The memory 1004 may include a RAM, where the machine readable instructions and data for a processor may reside during runtime.

Referring to FIGS. 1-10, and particularly to the block diagram 1000 shown in FIG. 10, the memory 1004 may include instructions 1006 to ascertain, for an application 104 that is to be generated, a plurality of fields that are declared.

The processor 1002 may fetch, decode, and execute the instructions 1008 to generate, based on the plurality of declared fields, a data model 106. The data model 106 may include a plurality of API keys associated with the plurality of declared fields.

The processor 1002 may fetch, decode, and execute the instructions 1010 to generate, based on the data model 106, a mapping file 110 to map a plurality of APIs that are to be invoked relative to the API keys.

Referring to FIGS. 1-9 and 11, and particularly FIG. 11, for the method 1100, at block 1102, the method may include ascertaining, by at least one hardware processor, for an application 104 that is to be generated, a plurality of fields that are declared.

At block 1104, the method may include generating, by the at least one hardware processor, based on the plurality of declared fields, a data model 106. The data model 106 may include a plurality of API keys associated with the plurality of declared fields.

At block 1106, the method may include generating, by the at least one hardware processor, based on the data model 106, a mapping file 110 to map a plurality of APIs that are to be invoked relative to the API keys.

At block 1108, the method may include generating, by the at least one hardware processor, based on the data model 106 and the mapping file 110, the application 104.

Referring to FIGS. 1-7 and 12, and particularly FIG. 12, for the block diagram 1200, the non-transitory computer readable medium 1202 may include instructions 1206 to ascertain, for an application 104 that is to be generated, a plurality of fields that are declared.

The processor 1204 may fetch, decode, and execute the instructions 1208 to generate, based on the plurality of declared fields, a data model 106. The data model 106 may include a plurality of API keys associated with the plurality of declared fields.

The processor 1204 may fetch, decode, and execute the instructions 1210 to generate, based on the data model 106, a mapping file 110 to map a plurality of APIs that are to be invoked relative to the API keys.

The processor 1204 may fetch, decode, and execute the instructions 1212 to generate, based on the data model 106 and the mapping file 110, a plurality of unstructured requests 116 to query the data model 106.

The processor 1204 may fetch, decode, and execute the instructions 1214 to analyze, by a service bus 122, the mapping file 110 to perform the plurality of unstructured requests 116.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A workflow-based dynamic data model and application generation system comprising:
   a processor; and
   a memory storing instructions that when executed by the processor cause the processor to:
   execute a data model generator to generate a user interface to receive user input of specific names of data fields to customize a particular application;
   receive, on the user interface, the user input of the specific names of the data fields for the particular application;
   generate a declared data model based on the specific names of the data fields received on the user interface, wherein the declared data model includes application programming interface (API) keys associated with the specific names of the data fields;
   generate, based on the declared data model, a mapping file to map specific APIs to the API keys of the declared data model, wherein the specific APIs in the mapping file are APIs to be invoked by the particular application; and
   generate, based on the declared data model and the mapping file, the particular application that includes the specific names of the data fields.

2. The workflow-based dynamic data model and application generation system according to claim 1, wherein the instructions further cause the processor to:
   in response to an execution of the particular application, invoke the specific APIs; and
   receive a response including the specific names of the data fields of the particular application in response to the specific APIs being invoked.

3. The workflow-based dynamic data model and application generation system according to claim 1, wherein the instructions further cause the processor to:
   generate, based on the declared data model and the mapping file, a plurality of unstructured requests to query the declared data model for offline data retrieval.

4. The workflow-based dynamic data model and application generation system according to claim 1, wherein the instructions further cause the processor to:
   generate, based on the declared data model and the mapping file, a plurality of unstructured requests to query the declared data model for online data retrieval; and
   analyze, via a service bus, the mapping file to perform the plurality of unstructured requests.

5. The workflow-based dynamic data model and application generation system according to claim 1, wherein the instructions cause the processor to:
   analyze the declared data model,
   generate, based on the analysis of the declared data model, a plurality of unstructured requests, and
   receive, in response to the plurality of unstructured requests, unstructured responses.

6. The workflow-based dynamic data model and application generation system according to claim 5, wherein the instructions further cause the processor to:
   receive, via a service bus, the plurality of unstructured requests,
   translate, based on the mapping file, the plurality of unstructured requests into a plurality of structured requests for mapping to an existing data model,
   receive, from the existing data model, structured responses corresponding to the plurality of structured requests,
   translate, via the service bus, the structured responses corresponding to the plurality of structured requests into the unstructured responses, and
   forward the unstructured responses to a persistence library.

7. The workflow-based dynamic data model and application generation system according to claim 6, wherein the plurality of unstructured requests include unstructured JavaScript Object Notation (JSON) format requests, and the unstructured responses include unstructured JSON format responses.

8. The workflow-based dynamic data model and application generation system according to claim 1, wherein the user input received on the user interface further includes a description of types of the data fields.

9. The workflow-based dynamic data model and application generation system according to claim 1, wherein the specific names of the data fields received on the user interface are different from existing names of data fields of existing applications.

10. The workflow-based dynamic data model and application generation system according to claim 8, wherein the description of the types of the data fields describes the data fields as numeric fields or alphanumeric fields.

11. A method for workflow-based dynamic data model and application generation, the method comprising:
   executing, by at least one hardware processor, a data model generator to generate a user interface to receive user input of specific names of data fields to customize a particular application;
   receiving, by the at least one hardware processor via the user interface, the user input of the specific names of the data fields for the particular application;
   generating, by the at least one hardware processor, a declared data model based on the specific names of the data fields received on the user interface, wherein the declared data model includes application programming interface (API) keys associated with the specific names of the data fields;
   generating, by the at least one hardware processor, based on the declared data model, a mapping file to map specific APIs to the API keys of the declared data model, wherein the specific APIs in the mapping file are APIs to be invoked by the particular application; and
   generating, by the at least one hardware processor, based on the declared data model and the mapping file, the particular application that includes the specific names of the data fields.

12. The method according to claim 11, further comprising:
   generating, by the at least one hardware processor, based on the declared data model and the mapping file, a plurality of unstructured requests to query the declared data model for offline data retrieval.

13. The method according to claim 11, further comprising:
   generating, by the at least one hardware processor, based on the declared data model and the mapping file, a plurality of unstructured requests to query the declared data model for online data retrieval; and
   analyzing, by the at least one hardware processor, the mapping file to perform the plurality of unstructured requests.

14. The method according to claim 11, further comprising:
   utilizing, for the particular application, a persistence library to
      analyze the declared data model,
      generate, based on the analysis of the declared data model, a plurality of unstructured requests, and
      receive, in response to the plurality of unstructured requests, unstructured responses.

15. The method according to claim 14, further comprising:
   receiving, by a service bus that is executed by the at least one hardware processor, the plurality of unstructured requests;
   translating, by the service bus, based on the mapping file, the plurality of unstructured requests into a plurality of structured requests for mapping to an existing data model;
   receiving, from the existing data model, a plurality of structured responses corresponding to the plurality of structured requests;
   translating, by the service bus, the plurality of structured responses corresponding to the plurality of structured requests into the unstructured responses; and
   forwarding, by the service bus, the unstructured responses to the persistence library.

16. The method according to claim 15, wherein the plurality of unstructured requests include unstructured JavaScript Object Notation (JSON) format requests, and the unstructured responses include unstructured JSON format responses.

17. A non-transitory computer readable medium having stored thereon machine readable instructions, the machine readable instructions, when executed by at least one hardware processor, cause the at least one hardware processor to:
   execute a data model generator to generate a user interface to receive user input of specific names of data fields to customize a particular application;
   receive, on the user interface, the user input of the specific names of the data fields for the particular application;
   generate a declared data model based on the specific names of the data fields received on the user interface, wherein the declared data model includes application programming interface (API) keys associated with the specific names of the data fields;
   generate, based on the declared data model, a mapping file to map specific APIs to the API keys of the declared data model, wherein the specific APIs in the mapping file are APIs to be invoked by the particular application; and
   generate, based on the declared data model and the mapping file, the particular application that includes the specific names of the data fields.

18. The non-transitory computer readable medium according to claim 17, wherein the machine readable instructions, when executed by the at least one hardware processor, further cause the at least one hardware processor to:
   analyze the declared data model;
   generate, based on the analysis of the declared data model, a plurality of unstructured requests; and
   receive, in response to the plurality of unstructured requests, unstructured responses.

19. The non-transitory computer readable medium according to claim 18, wherein the machine readable instructions, when executed by the at least one hardware processor, further cause the at least one hardware processor to:
   receive, via a service bus, a plurality of unstructured requests;
   translate, by the service bus and based on the mapping file, the plurality of unstructured requests into a plurality of structured requests for mapping to an existing data model;
   receive, from the existing data model, structured responses corresponding to the plurality of structured requests;
   translate, by the service bus, the structured responses corresponding to the plurality of structured requests into the unstructured responses; and
   forward, by the service bus, the unstructured responses to a persistence library.

20. The non-transitory computer readable medium according to claim 18, wherein the plurality of unstructured requests include unstructured JavaScript Object Notation (JSON) format requests, and the unstructured responses include unstructured JSON format responses.

* * * * *